(12) United States Patent
Bullis et al.

(10) Patent No.: US 9,110,893 B2
(45) Date of Patent: Aug. 18, 2015

(54) COMBINING PROBLEM AND SOLUTION ARTIFACTS

(75) Inventors: Paul Kenneth Bullis, Round Rock, TX (US); Li Chen, Cary, NC (US); Daniel P. Julin, New York, NY (US); Carolyn Haibt Norton, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/613,348

(22) Filed: Sep. 13, 2012

(65) Prior Publication Data

US 2014/0074870 A1     Mar. 13, 2014

(51) Int. Cl.
   *G06F 17/30*     (2006.01)

(52) U.S. Cl.
   CPC ..................... *G06F 17/30* (2013.01)

(58) Field of Classification Search
   CPC ................................................. G06F 17/30094
   USPC ......... 707/602, 608, 687, 705, 790, 813, 821, 707/791
   See application file for complete search history.

(56) References Cited

U.S. PATENT DOCUMENTS

| | | | | |
|---|---|---|---|---|
| 5,632,624 | A * | 5/1997 | Cameron et al. | 434/322 |
| 6,571,236 | B1 | 5/2003 | Ruppelt | 707/3 |
| 6,571,251 | B1 | 5/2003 | Koski et al. | 707/102 |
| 8,607,203 | B1 * | 12/2013 | Mehra | 717/131 |
| 2004/0083191 | A1 | 4/2004 | Ronnewinkel et al. | 706/20 |
| 2005/0266387 | A1 * | 12/2005 | Rossides | 434/323 |
| 2008/0266387 | A1 * | 10/2008 | Krijn et al. | 348/51 |
| 2011/0004499 | A1 | 1/2011 | Zhang et al. | 705/7 |
| 2011/0016347 | A1 | 1/2011 | Brodeur et al. | 714/2 |
| 2012/0107787 | A1 | 5/2012 | Zimmerman et al. | 434/322 |

OTHER PUBLICATIONS

IBM, "Centralized mechanism for project team development artifacts for purpose to reuse for system deployment, configuration, reporting and management," ip.com, IPCOM000160721D, Nov. 2007, 3 pages.

Anonymous, "A system and method to notify related artifact changes by maintaining artifact relationship," ip.com, IPCOM000209495D, Aug. 2011, 5 pages.

* cited by examiner

*Primary Examiner* — Sana Al Hashemi
(74) *Attorney, Agent, or Firm* — VanLeeuwen & VanLeeuwen; Joseph C. Polimeni (57) ABSTRACT

An approach is provided in which a resolution manager stores a machine-readable problem, which includes a problem signature, and a human-readable solution in a document. The resolution manager receives an output file from a computer system and matches an output entry included in the output file to the problem signature. In turn, the resolution manager identifies the human-readable solution corresponding to the matched problem signature and provides the identified human-readable solution to the computer system.

14 Claims, 7 Drawing Sheets

FIG. 1

Combinatory Artifacts Document 200

Machine-Readable Problem 210

```
[[<div name="rule1" style= "DISPLAY:none">]
[<property name='rulesName'>]CheckIOTimeoutValidity[</property>]
[<property name='rulesSeverity'>]Warning[</property>]
[<property name='rulesMessage'>]IOTimeout should be changed to a non-zero value, this may cause
your Web server to wait too long before timing out when your server is slow or hung.[</property>]
[<property name='rulesContext'>]Server[</property>]
[<property name='expPart'>]
[<propertySpecs name="IOTimeout" keyPattern="[^:]+::components::components\[\d*\
]::Settings::IOTimeout"/>]
[<validationExpression xsi:type="com.xxx.rules.model:Expression" exp="IOTimeout->select(value='0')"
imports="//@categories.0/@rules.0/@propertySpecs.0"/>]
[</property>]
[</div>]
...
```

Problem Signature 220

Human-Readable Solution 230

Question
In the Web server plug-in, what do the LoadBalanceWeight, MaxConnections, ConnectTimeout, ServerIOTimeout, RetryInterval, IgnoreAffinityRequests, and GetDWLMTable options mean and what are the recommended settings for these options?

What affect does Session Affinity have?

How are connections handled during plug-in fail-over?

What is the effect of using more than one Web server child process?

Answer
To understand how load balancing works in the Web server plug-in, see Understanding IBM HTTP Server plug-in Load Balancing in a clustered environment.

To understand how fail-over works in the Web server plug-in, see Understanding HTTP plug-in failover in a clustered environment.

LoadBalanceWeight is a starting "weight". The value is dynamically changed by the Plug-in during runtime. The "weight" of a server (or clone) is lowered each time a request is assigned to that clone. When all weights for all servers drop to 0 or below, the Plug-in has to readjust all of the weights so that they are above 0. Using a starting value of only 2 (default), means that the weights will get to 0 very quickly and the Plug-in will constantly be readjusting the weights. So, I tell customers to start with a much higher LoadBalanceWeight. The IBM® WebSphere® Application Server administrative console will allow a value up to 20 for this. However, it is certainly possible to manually edit the plugin-cfg.xml file and specify some other value for LoadBalanceWeight that is higher than 20.

*FIG. 2*

| Signature File 155 | |
|---|---|
| Problem Signature | Solution Pointer |
| exp="IOTimeout->select(value='0')" | http://www-01.ibm.com/support/docview.wss?uid=swg21318463 |
| | |
| | |
| ... | ... |

COMBINING PROBLEM AND SOLUTION ARTIFACTS

BACKGROUND

The present disclosure relates to combining problem artifacts and solution artifacts into a common searchable document to improve problem resolution quality and efficiency.

Many customer support industries utilize knowledge engineers to document frequently occurring problems. In addition, the knowledge engineers may prepare separate documents that include solutions to the frequently occurring problems. As such, a customer may utilize separate problem documents and solution documents to perform self-help analysis pertaining to issues such as computer problems. In one embodiment, a document that describes the problems, a document that describes the solutions, and rules that that detect the problems may each be stored in separate repositories.

BRIEF SUMMARY

According to one embodiment of the present disclosure, an approach is provided in which a resolution manager stores a machine-readable problem, which includes a problem signature, and a human-readable solution in a document. The resolution manager receives an output file from a computer system and matches an output entry included in the output file to the problem signature. In turn, the resolution manager identifies the human-readable solution corresponding to the matched problem signature and provides the identified human-readable solution to the computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 2 is a diagram showing a combinatory artifacts document that includes a human-readable solution and a machine-readable problem;

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

Figure 1:
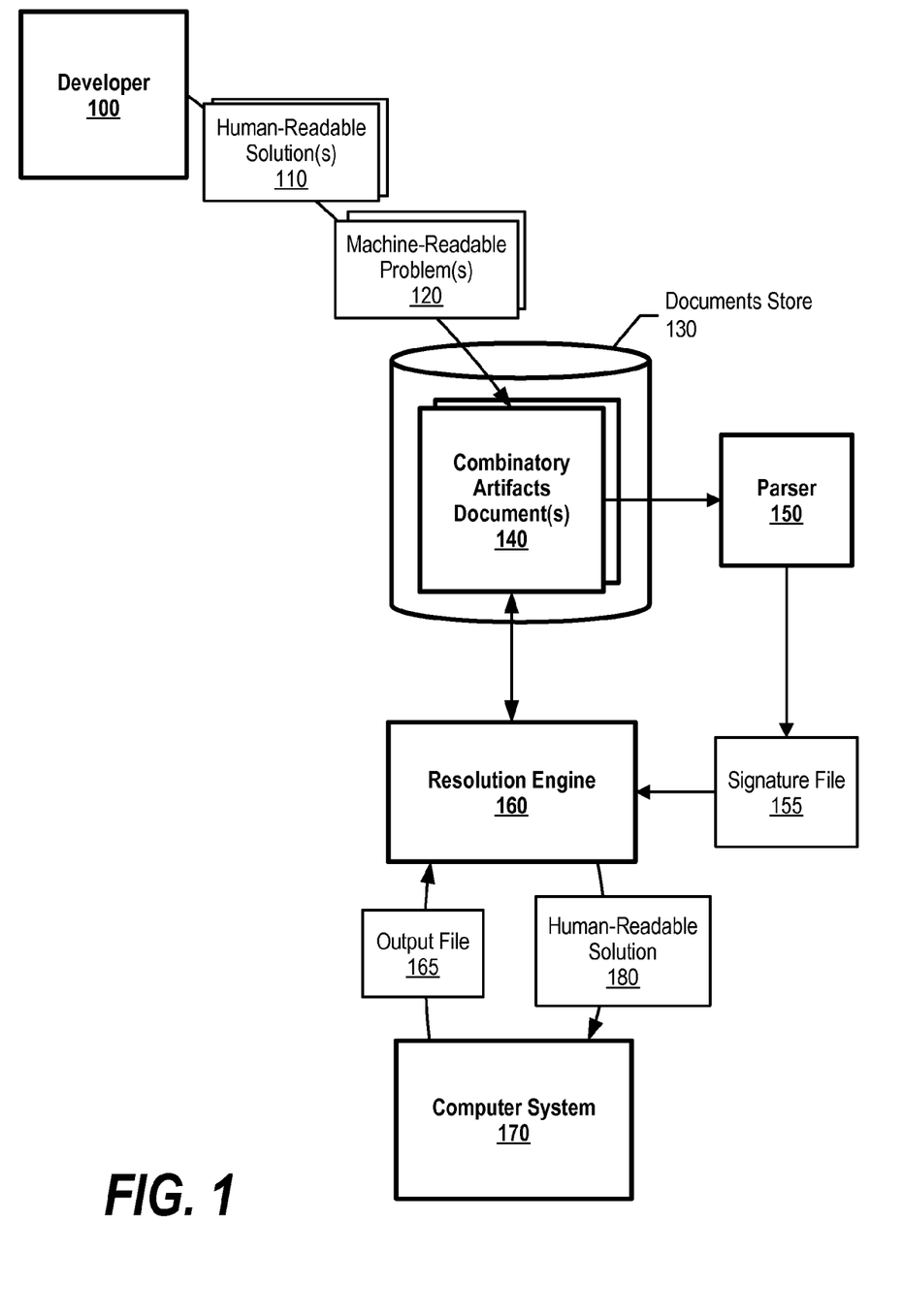
FIG. 1 is a diagram showing a developer generating combinatory artifacts documents and utilizing the documents to provide human-readable solutions based upon machine-readable problem signatures.

FIG. 1 is a diagram showing a developer generating combinatory artifacts documents and utilizing the documents to provide human-readable solutions based upon machine-readable problem signatures. Developer 100 combines human-readable solution 110 and machine-readable problem into combinatory artifacts document 140 (stored in documents store 130). In one embodiment, human-readable solution 110 is stored as visible text and machine-readable problem 120 is stored as hidden text (e.g., hidden HTML text). As such, combinatory artifacts document 140 allows a computer system (computer system 170) to display a human-readable solution to a user that solves a machine-readable problem.

In one embodiment, machine-readable problems and machine-readable problem identifiers are orientated towards machine recognition, such as text or source code that are recognized by a machine (e.g., a scan tool) and matched to an input (e.g., configuration files, log files, etc.) to identify a problem. Human-readable solutions, in this embodiment, are solutions that are oriented towards human recognition, such as formatted text used to display a solution on a display to a user (e.g., step-by-step instructions, suggested configuration change, etc.).

Parser 150 parses combinatory artifacts document 140 and identifies machine-readable problem signatures included in machine-readable problem 120 (see FIG. 2 and corresponding text for further details). Parser 150 also creates a solution pointer that includes the location of the human-readable solution corresponding to the machine-readable problem signature. In turn, parser 150 pairs the machine-readable problem signature and the solution pointer into a signature entry that is stored in signature file 155 (see FIG. 3 and corresponding text for further details).

When resolution engine 160 receives output file 165 from computer system, resolution engine proceeds through a process of matching the machine-readable problem signatures included in signature file 155 with output entries included in output file 165 (e.g., configuration information that may include error codes).

When resolution engine 160 detects a match, resolution engine 160 identifies the solution pointer in signature file 155 that corresponds to the matched machine-readable problem signature, and retrieves the human-readable solution from combinatory artifacts documents 140. In turn, resolution engine 160 sends human-readable solution 180 to computer system 170 for the user to view.

In one embodiment, resolution engine 160 sends the solution pointer to computer system 170 in a search result document, which computer system displays through a user interface. In another embodiment, resolution engine 160 provides the entire combinatory artifacts document to computer system 170 that, in turn, computer system only displays the human-readable solution visible text.

In yet another embodiment, the document management lifecycle process is simplified by combining machine-readable problems with human-readable solutions into one document. In this embodiment, a combined document may be distributed/updated/deleted instead of distributing/updating/deleting separate documents.

FIG. 2 is a diagram showing a combinatory artifacts document that includes a human-readable solution and a machine-readable problem. Combinatory artifacts document 200 includes machine-readable problem 210 and human-readable solution 230. In one embodiment, machine-readable problem 210 is written as hidden text and human-readable solution 230 is written as visible text. Machine-readable problem 210 includes problem signature 220. In one embodiment, machine-readable problem 210 may include executable code as a problem signature.

Since machine-readable problem 210 is hidden, resolution engine 160 may provide combinatory artifacts document 200 "as-is" to a computer system and the computer system displays only human-readable solution 230 on a display.

Figure 3:
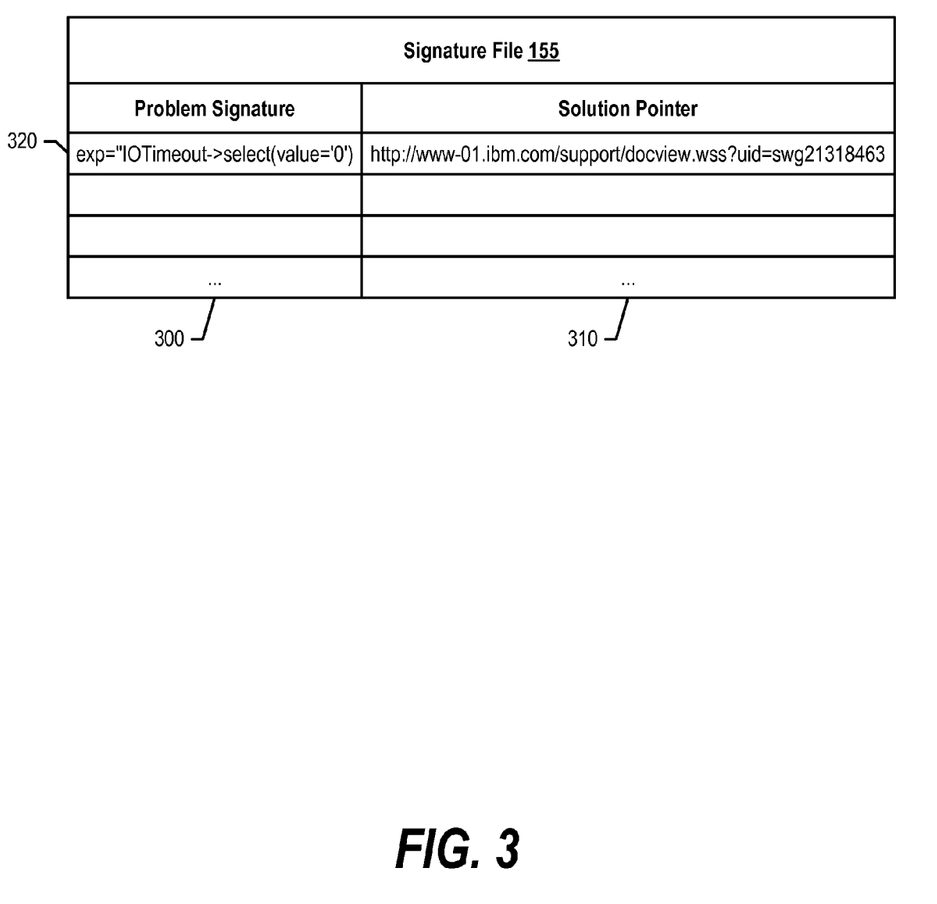
FIG. 3 is a diagram showing a signature file that includes problem signatures and solution pointers.

FIG. 3 is a diagram showing a signature file that includes problem signatures and solution pointers. Signature file 155 includes columns 300 and 310. Column 300 includes a list of machine-readable problem signatures that resolution engine 160 extracts from machine-readable problems. Column 310 includes a list of solution pointers that point to human-readable solutions that corresponds to the machine-readable problem signatures included in column 300. Resolution engine 160 includes the machine-readable problem signatures and solution pointers into a signature entry (e.g., signature entry 320) and stores them as a pair in signature file 155.

Figure 4:
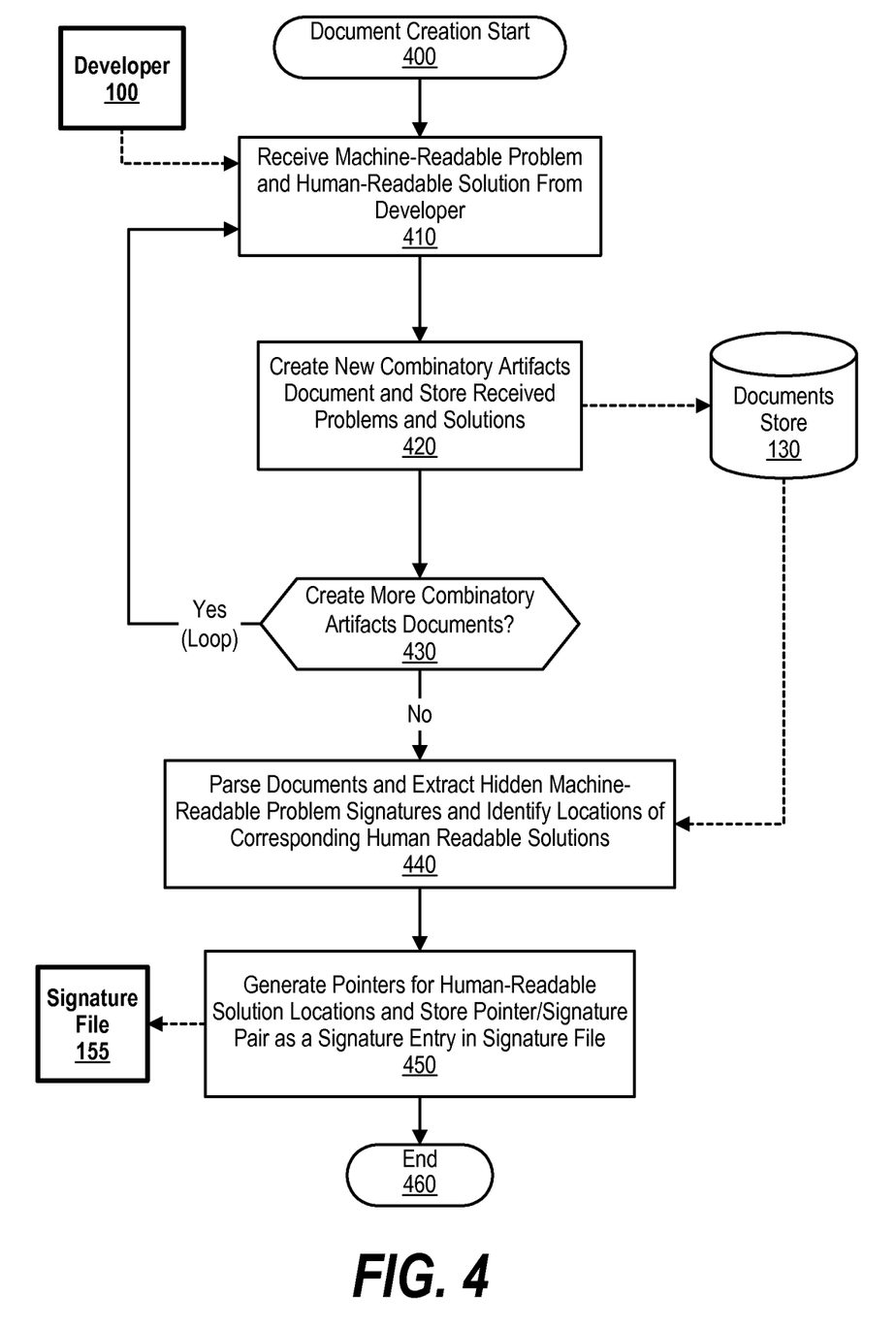
FIG. 4 is a flowchart showing steps taken in creating a combinatory artifacts document and a signature file.

FIG. 4 is a flowchart showing steps taken in creating a combinatory artifacts document and a signature file. Processing commences at 400, whereupon processing receives a machine-readable problem and a human-readable solution from developer 100 at step 410. In one embodiment, the machine-readable problem is written as hidden text and the human-readable solution is written as visible text.

At step 420, processing includes the machine-readable problem and the corresponding human-readable solution into a new combinatory artifact document and stores the document in documents store 130. A determination is made as to whether developer 100 wishes to provide more machine-readable problems and corresponding human-readable solutions to create more combinatory artifacts documents (decision 430). If developer 100 wishes to provide more content, decision 430 branches to the "Yes" branch, whereupon processing loops back to receive more solutions and problems from developer 100. This looping continues until developer 100 finishes providing content, at which point decision 430 branches to the "No" branch.

In one embodiment, processing creates a new combinatory artifacts document for each pair of machine-readable problems and human-readable solutions. In another embodiment, processing creates one combinatory artifacts document that includes each of the paired machine-readable problems and human-readable solutions.

At step 440, processing parses the combinatory artifacts documents and extracts machine-readable problem signatures from the machine-readable problems. Processing also identifies locations of human-readable solutions that correspond to the machine-readable problem signatures (see FIG. 2 and corresponding text for further details).

Processing then generates solution pointers for the human-readable solution locations and stores each solution pointer with its corresponding machine-readable problem signature as a signature entry in signature file 155 at step 450 (see FIG. 3 and corresponding text for further details). Processing ends at 460.

Figure 5:
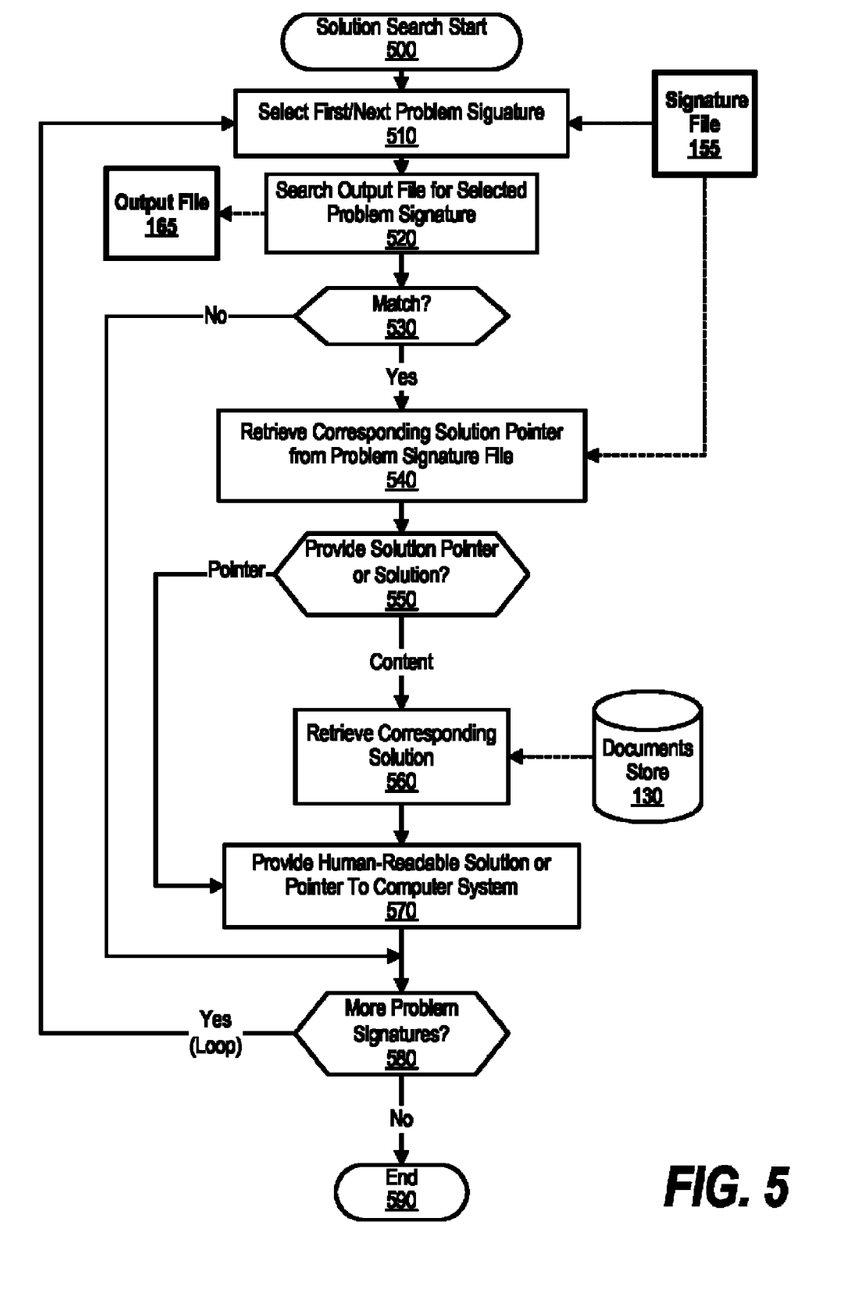
FIG. 5 is a flowchart showing steps taken in providing human-readable solutions by matching output entries included in an output file with machine-readable problem signatures.

FIG. 5 is a flowchart showing steps taken in providing human-readable solutions by matching output entries included in an output file with machine-readable problem signatures. Processing commences at 500, whereupon processing selects a machine-readable problem signature from signature file 155 at step 510. At step 520, processing searches output file 165 for the selected problem signature. In one embodiment, the signature file may be executable code that processing executes and compares the results against output file 165.

A determination is made as to whether a match occurred from the searching (decision 530). If processing does not find a match of the selected problem signature with the content in output file 165, decision 530 branches the "No" branch. On the other hand, if a match occurred, decision 530 branches to the "Yes" branch, whereupon processing retrieves the solution pointer from signature file 155 that corresponds to the matched problem signature at step 540. A determination is made as to whether to provide the solution pointer or the solution content to the user (decision 550).

If processing should provide the human-readable solution, decision 550 branches to the "Content" branch, whereupon processing utilizes the solution pointer to locate and retrieve the human-readable solution (or combinatory artifacts document) from documents store 130 (step 560). On the other hand, if processing should provide the solution pointer to the computer system, decision 550 branches to the "Pointer" branch, bypassing content retrieval step 560. At step 570, processing provides the human-readable solution, combinatory artifacts document, or pointer to the computer system.

A determination is made as to whether there are more problem signatures included in signature file 155 to search in output file 165 (decision 580). If so, decision 580 branches to the "Yes" branch, which loops back to select and process the next problem signature. This looping continues until there are no more problem signatures to process, at which point decision 580 branches to the "No" branch, whereupon processing ends at 590.

Figure 6:
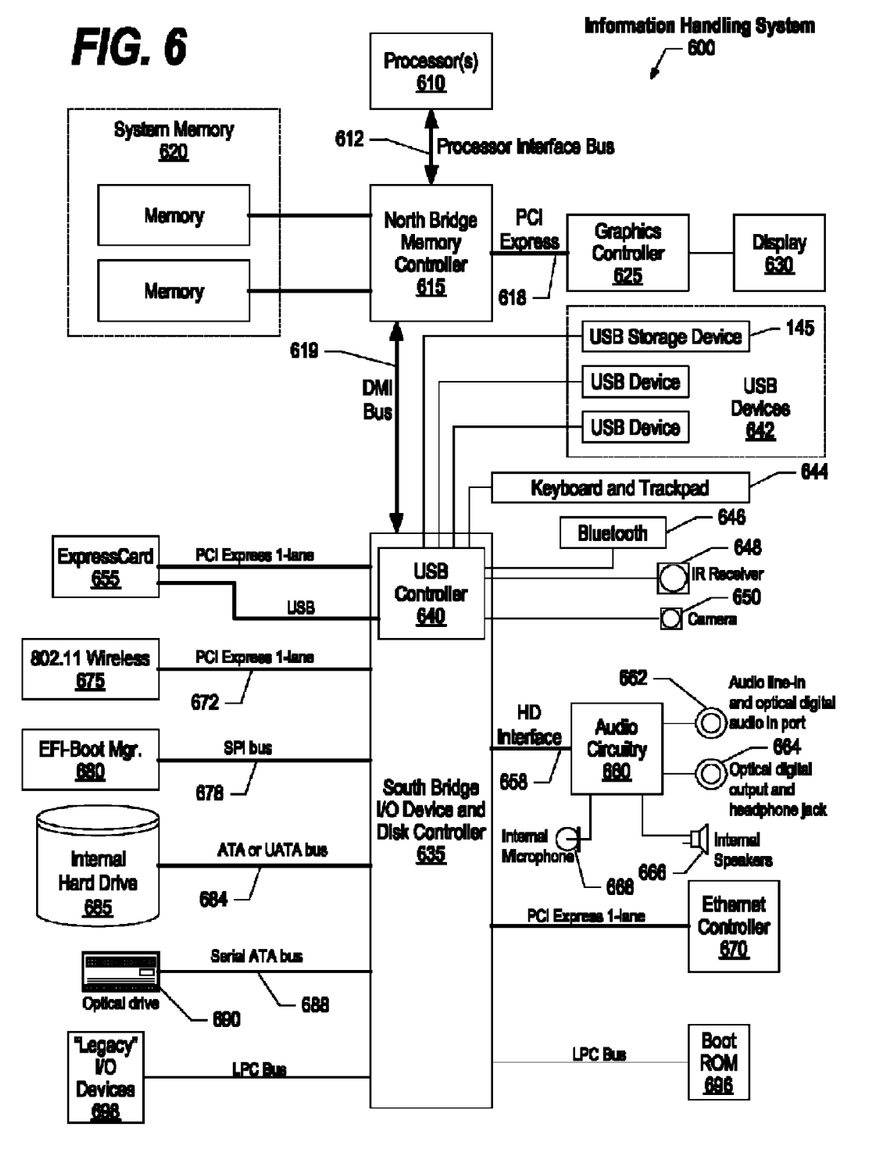
FIG. 6 is a block diagram of a data processing system in which the methods described herein can be implemented.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wireless communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 7:
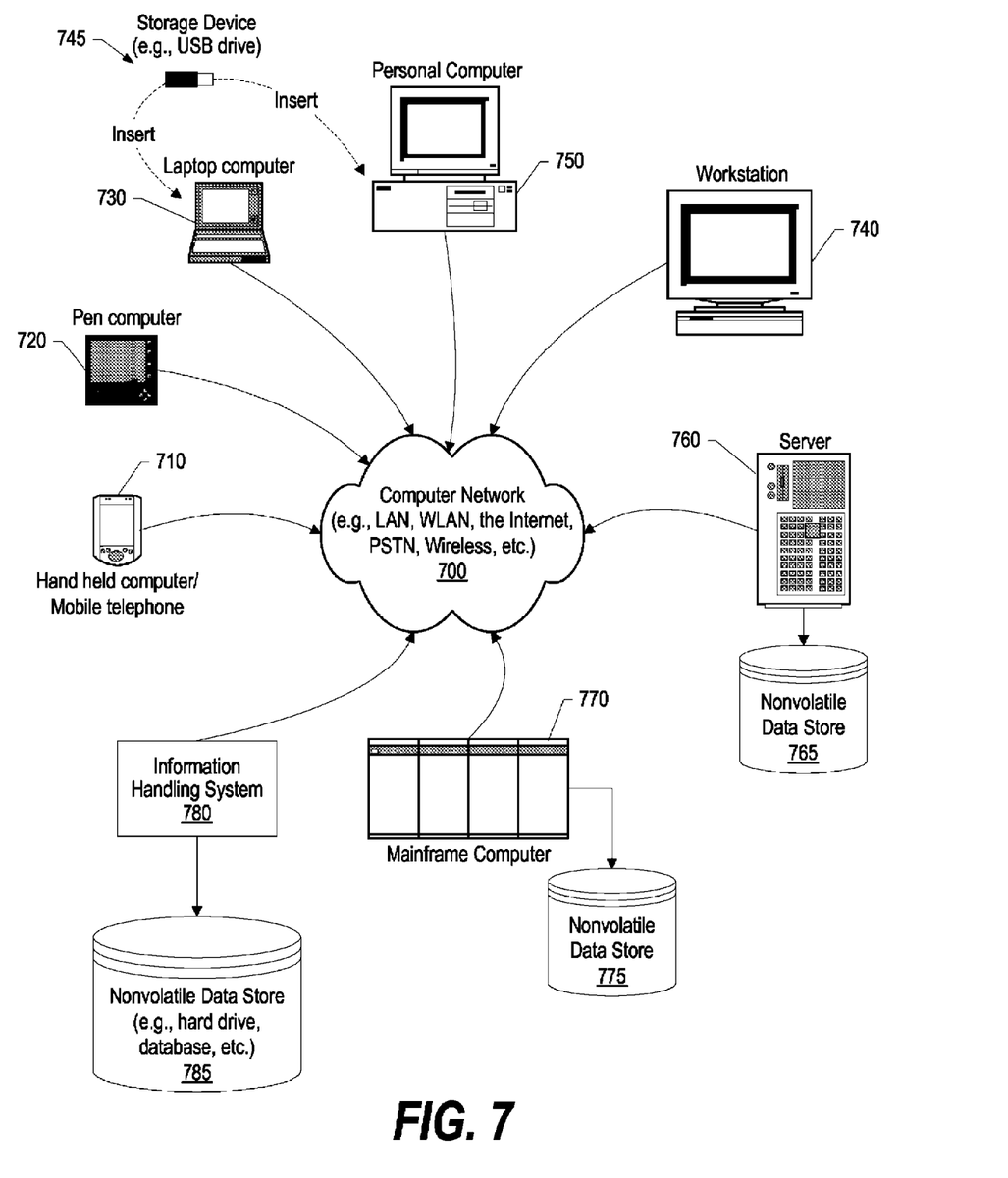
FIG. 7 provides an extension of the information handling system environment shown in FIG. 6 to illustrate that the methods described herein can be performed on a wide variety of information handling systems which operate in a networked environment.

FIG. 7 provides an extension of the information handling system environment shown in FIG. 6 to illustrate that the methods described herein can be performed on a wide variety of information handling systems that operate in a networked environment. Types of information handling systems range from small handheld devices, such as handheld computer/mobile telephone 710 to large mainframe systems, such as mainframe computer 770. Examples of handheld computer 710 include personal digital assistants (PDAs), personal entertainment devices, such as MP3 players, portable televisions, and compact disc players. Other examples of information handling systems include pen, or tablet, computer 720, laptop, or notebook, computer 730, workstation 740, personal computer system 750, and server 760. Other types of information handling systems that are not individually shown in FIG. 7 are represented by information handling system 780. As shown, the various information handling systems can be networked together using computer network 700. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 7 depicts separate nonvolatile data stores (server 760 utilizes nonvolatile data store 765, mainframe computer 770 utilizes nonvolatile data store 775, and information handling system 780 utilizes nonvolatile data store 785). The nonvolatile data store can be a component that is external to the various information handling systems or can be internal to one of the information handling systems. In addition, removable nonvolatile storage device 645 can be shared among two or more information handling systems using various techniques, such as connecting the removable nonvolatile storage device 645 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:
1. A method comprising:
    storing, in a document, a plurality of human-readable solutions written in a natural language and a plurality of machine-readable problems, wherein each of the plurality of machine-readable problems includes a machine- readable problem signature written in a source code format, resulting in a plurality of machine-readable problem signatures;

creating a plurality of solution pointers that link each of the plurality of machine-readable problem signatures to a corresponding one of the plurality of human-readable solutions;

receiving an output file from a computer system that includes one or more output entries;

generating one or more results by executing executable code included in a selected one of the plurality of machine-readable problem signatures;

matching one of the one or more output entries to the one or more results;

retrieving, in response to the matching, one of the plurality of human-readable solutions from the document based upon a selected one of the plurality of solution pointers that correspond to the selected machine-readable problem signature; and providing the retrieved human-readable solution to the computer system.

2. An information handling system comprising:
one or more processors;
a memory coupled to at least one of the processors;
a set of computer program instructions stored in the memory and executed by at least one of the processors in order to perform actions of:

storing, in a document, a plurality of human-readable solutions written in a natural language and a plurality of machine-readable problems, wherein each of the plurality of machine-readable problems includes a machine-readable problem signature written in a source code format, resulting in a plurality of machine-readable problem signatures;

creating a plurality of solution pointers that link each of the plurality of machine-readable problem signatures to a corresponding one of the plurality of human-readable solutions;

receiving an output file from a computer system that includes one or more output entries;

generating one or more results by executing executable code included in a selected one of the plurality of machine-readable problem signatures;

matching one of the one or more output entries to the one or more results;

retrieving, in response to the matching, one of the plurality of human-readable solutions from the document based upon a selected one of the plurality of solution pointers that correspond to the selected machine-readable problem signature; and providing the retrieved human-readable solution to the computer system.

3. A computer program product stored in a computer readable storage medium, comprising computer program code that, when executed by an information handling system, causes the information handling system to perform actions comprising:

storing, in a document, a plurality of human-readable solutions written in a natural language and a plurality of machine-readable problems, wherein each of the plurality of machine-readable problems includes a machine-readable problem signature written in a source code format, resulting in a plurality of machine-readable problem signatures;

creating a plurality of solution pointers that link each of the plurality of machine-readable problem signatures to a corresponding one of the plurality of human-readable solutions;

receiving an output file from a computer system that includes one or more output entries;

generating one or more results by executing executable code included in a selected one of the plurality of machine-readable problem signatures;

matching one of the one or more output entries to the one or more results;

retrieving, in response to the matching, one of the plurality of human-readable solutions from the document based upon a selected one of the plurality of solution pointers that correspond to the selected machine-readable problem signature; and providing the retrieved human-readable solution to the computer system.

4. The method of claim 1 further comprising:
parsing the document and extracting the plurality of machine-readable problem signatures;
selecting a different one of the extracted machine-readable problem signatures;
identifying one of the plurality of human-readable solutions that correspond to the different machine-readable problem signature;
creating a different one of the plurality of solution pointers that points to a location of the identified human-readable solution; and
storing the different machine-readable problem signature with the different solution pointer in a signature entry.

5. The method of claim 1 further comprising:
providing the document to the computer system, wherein the computer system is adapted to display only the retrieved human-readable solution on a display.

6. The method of claim 1 wherein each of the plurality of machine-readable problem signatures is stored as hidden text and each of the plurality of human readable solutions are stored as visible text.

7. The information handling system of claim 2 wherein the processors perform additional actions comprising:
parsing the document and extracting the plurality of machine-readable problem signatures;
selecting a different one of the extracted machine-readable problem signatures;
identifying one of the plurality of human-readable solutions that correspond to the different machine-readable problem signature;
creating a different one of the plurality of solution pointers that points to a location of the identified human-readable solution; and
storing the different machine-readable problem signature with the different solution pointer in a signature entry.

8. The information handling system of claim 2 wherein processors perform additional actions comprising:
providing the document to the computer system, wherein the computer system is adapted to display only the retrieved human-readable solution on a display.

9. The information handling system of claim 2 wherein each of the plurality of machine-readable problem signatures is stored as hidden text and each of the plurality of human readable solutions are stored as visible text.

10. The computer program product of claim 3 wherein the information handling system performs further actions comprising:
parsing the document and extracting the plurality of machine-readable problem signatures;
selecting a different one of the extracted machine-readable problem signatures;
identifying one of the plurality of human-readable solutions that correspond to the different machine-readable problem signature;
creating a different one of the plurality of solution pointers that points to a location of the identified human-readable solution; and storing the different machine-readable problem signature with the different solution pointer in a signature entry.

11. The computer program product of claim 3 wherein the information handling system performs additional actions comprising:
providing the document to the computer system, wherein the computer system is adapted to display only the retrieved human-readable solution on a display.

12. The method of claim 4 further comprising:
performing a different parsing of the document, wherein the different parsing stores the plurality of machine-readable problem signatures to a file type that is different than a signature file that stores the signature entry.

13. The information handling system of claim 8 wherein the processors perform additional actions comprising:
performing a different parsing of the document, wherein the different parsing stores the plurality of machine-readable problem signatures to a file type that is different than a signature file that stores the signature entry.

14. The computer program product of claim 10 wherein the processors perform additional actions comprising:
performing a different parsing of the document, wherein the different parsing stores the plurality of machine-readable problem signatures to a file type that is different than a signature file that stores the signature entry.

* * * * *